United States Patent
Chhabra et al.

(10) Patent No.: US 11,521,400 B2
(45) Date of Patent: Dec. 6, 2022

(54) SYSTEMS AND METHODS FOR DETECTING LOGOS IN A VIDEO STREAM

(71) Applicant: Synamedia Limited, Staines Upon Thames (GB)

(72) Inventors: Amit Chhabra, Bangalore (IN); Sandipan Bhattacharjee, Bangalore (IN); Sonu Mariam George, Kerala (IN)

(73) Assignee: SYNAMEDIA LIMITED, Staines Upon Thames (GB)

( * ) Notice: Subject to any disclaimer, the term of this patent is extended or adjusted under 35 U.S.C. 154(b) by 219 days.

(21) Appl. No.: 16/706,357

(22) Filed: Dec. 6, 2019

(65) Prior Publication Data

US 2021/0174118 A1 Jun. 10, 2021

(51) Int. Cl.
| | |
|---|---|
| *G06V 20/62* | (2022.01) |
| *G06N 20/10* | (2019.01) |
| *G06N 3/08* | (2006.01) |
| *G06V 10/20* | (2022.01) |
| *G06V 10/75* | (2022.01) |
| *G06V 20/40* | (2022.01) |

(52) U.S. Cl.
CPC ............. *G06V 20/635* (2022.01); *G06N 3/08* (2013.01); *G06N 20/10* (2019.01); *G06V 10/255* (2022.01); *G06V 10/758* (2022.01); *G06V 20/46* (2022.01); *G06V 2201/09* (2022.01)

(58) Field of Classification Search
CPC ............... G06K 9/3266; G06K 9/3241; G06K 9/00744; G06K 9/6212; G06K 2209/25; G06K 9/4628; G06N 20/10; G06N 3/08
See application file for complete search history.

(56) References Cited

U.S. PATENT DOCUMENTS

| | | | |
|---|---|---|---|
| 5,912,986 A | 6/1999 | Shustorovich | |
| 8,965,117 B1 | 2/2015 | Rybakov et al. | |
| 9,405,985 B1 | 8/2016 | Burry et al. | |
| 10,970,577 B1* | 4/2021 | Song | G06K 9/6201 |
| 2010/0054585 A1 | 3/2010 | Guillou et al. | |
| 2011/0311140 A1 | 12/2011 | Urbach et al. | |
| 2014/0016864 A1* | 1/2014 | Chattopadhyay | G06K 9/6202 382/165 |
| 2016/0034773 A1 | 2/2016 | Goncalves | |
| 2017/0169056 A1* | 6/2017 | Brailovsky | G06F 16/951 |

(Continued)

OTHER PUBLICATIONS

R. Minetto et al., "Text Detection and Recognition in Urban Scenes," UPMC Univ Paris, Paris, France, University of Campinas UNICAMP, Brazil, 8 pages.

(Continued)

*Primary Examiner* — Jianxun Yang
(74) *Attorney, Agent, or Firm* — Finnegan, Henderson, Farabow, Garrett & Dunner, LLP

(57) ABSTRACT

A method for identifying a logo within at least one image includes identifying an area containing the logo within the at least one image, extracting logo features from the area by analyzing image gradient vectors associated with the at least one image, and using a machine learning model to identify the logo from the extracted logo features, wherein the machine learning model is trained to identify at least one target logo based on a received image data containing the logo features.

21 Claims, 16 Drawing Sheets

(56) References Cited

U.S. PATENT DOCUMENTS

2018/0307942 A1* 10/2018 Pereira ................ G06K 9/6267

OTHER PUBLICATIONS

Ling Ding et al., "Improved Road Marking Detection and Recognition," 2018 15th international Symposium on Pervasive Systems, Algorithms and Networks, 6 pages.
Patentability Search Report for "Apparatus and method to detect logos in video stream in real time," Jul. 30, 2019.

* cited by examiner

FIG. 1B
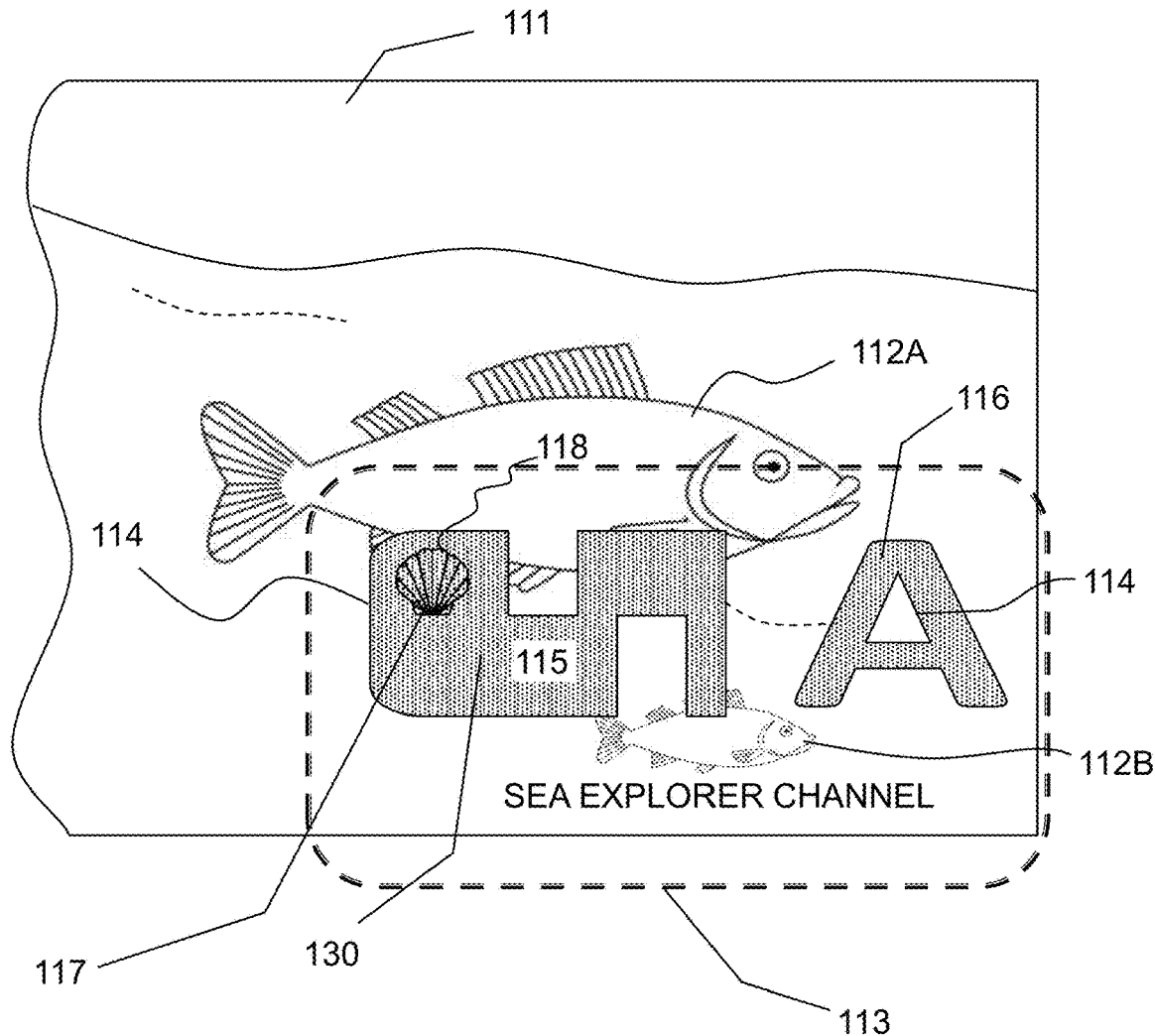
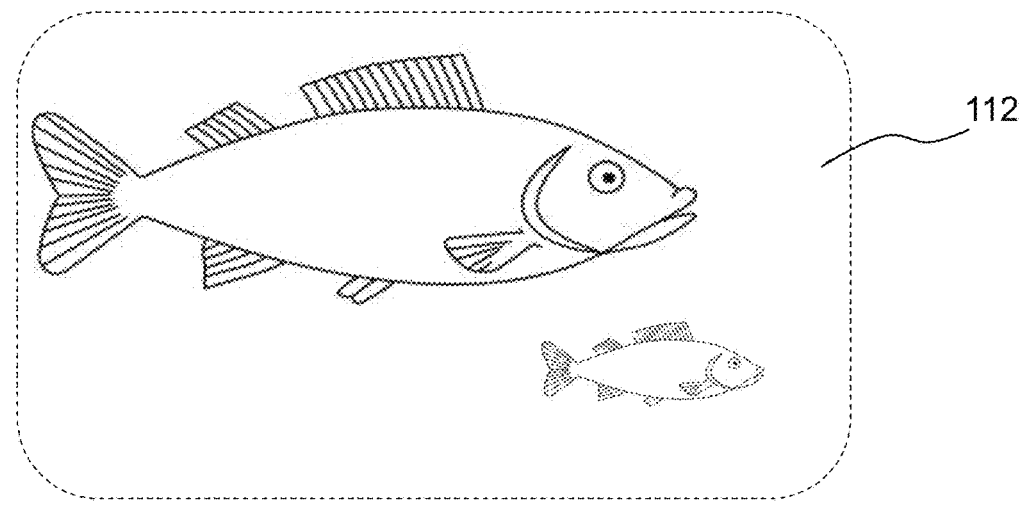

200

300

700

FIG. 7B
*Approach 1*
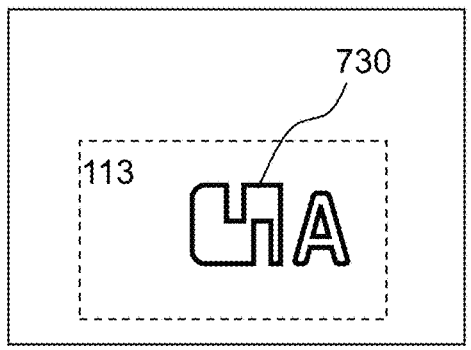
*Approach 2*
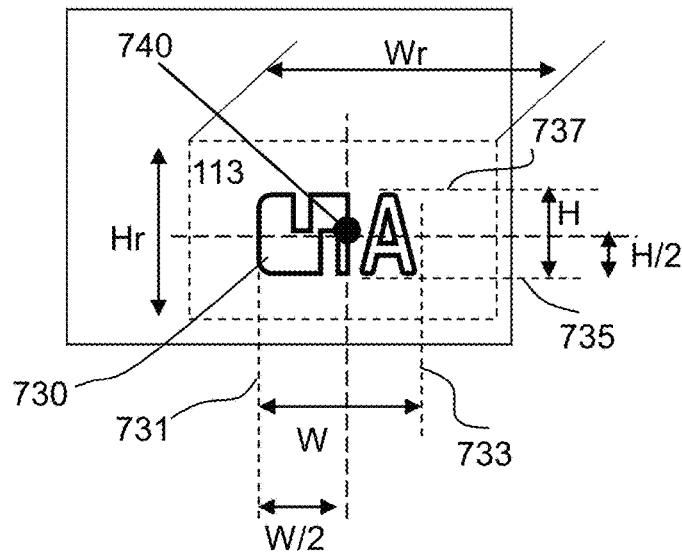
*Approach 3*
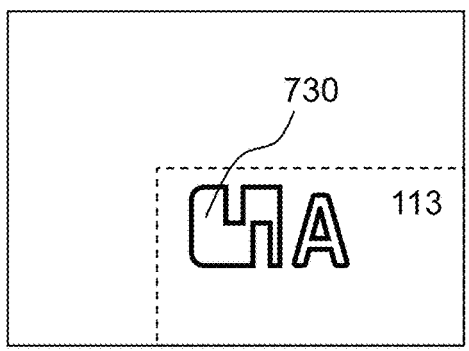
*Approach 4*
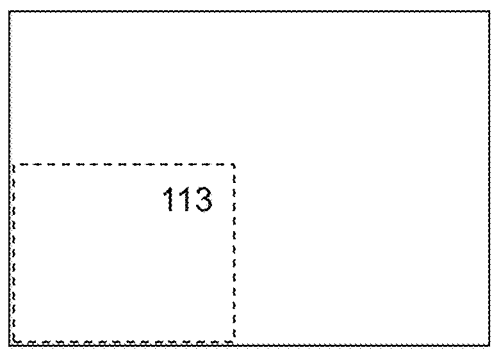
*Approach 5*
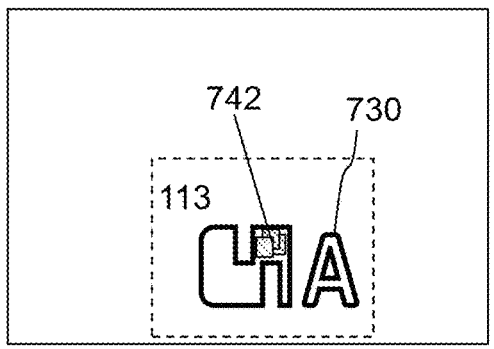

800

802

803

SYSTEMS AND METHODS FOR DETECTING LOGOS IN A VIDEO STREAM

TECHNICAL FIELD

The present disclosure relates to systems and methods for image recognition, and more particularly, to systems and methods for recognizing image objects in video content.

BACKGROUND

Broadcast content frequently contain logos identifying the operator and/or a provider of the program. For example, MSNBC may include an MSNBC logo in its broadcast content, and a Sky operator may include its associated Sky logo in its broadcast. These logos are used to protect content from illegal copying and distribution. For example, if a broadcast program containing an MSNBC logo is distributed by an entity that is not authorized to distribute MSNBC programming, the entity may be required to stop distributing the program. Such illegal distributions may be identified by web crawlers. In order for a web crawler to identify illegal content, the web crawler needs to be able to identify with high certainty the logo associated with a content provider (e.g., HBO, BBC, and the like) of the broadcasting program as well as an operator of the content distribution network (e.g., Sky operator, COMCAST, and the like).

Logo detection in a video stream is a difficult and challenging as compared to simple identification of known objects in a video stream. For example, when identifying a person's face, his/her nose, eyes, mouth, and/or chin may be used as unique features relative to which a position and shape of a forehead and cheeks may be predicted. A nose may be used as a unique entity based on which the rest of the face is mapped.

In contrast, identifying logos may be more challenging as logos come with different characteristics, and there may not be unique attributes among different logos. Frequently, convolutional neural networks (CNN) are employed to identify an image, since CNN may map image data to an output variable. However, using CNN for identifying logos in a video stream may be challenging, because logos overlay the video stream and frequently include transparent regions. As pixels of the video stream change from one image frame to another, the image of the logo containing transparent regions may change. Since an image of the logo changes, the image may be poorly identified by CNN, as CNN may not be trained to identify the logo overlaying a particular image frame of the video stream. And even if CNN is trained to identify a logo, training CNN requires a lot of training images (hundreds or thousands of images) to ensure that the logo overlaying various image frames can be identified. Thus, training CNN may be time-consuming and may not lead to accurate results.

The disclosed systems and methods for detecting a logo within a video stream address one or more of the problems set forth above and/or other problems in the prior art.

SUMMARY

Consistent with a disclosed embodiment, a method for identifying a logo within at least one image includes identifying an area containing the logo within the at least one image, extracting logo features from the area by analyzing image gradient vectors associated with the at least one image, and using a machine learning model to identify the logo from the extracted logo features, wherein the machine learning model is trained to identify at least one target logo based on a received image data containing the logo features.

Consistent with another disclosed embodiment, a method for identifying a logo within a video signal includes determining pixels within image frames of the video signal such that a pixel from the pixels has either a constant color value in the image frames or has the color value that changes periodically in the image frames, extracting the pixels from an image frame of the image frames, and using a machine learning model to identify the logo from an image formed by the extracted pixels, wherein the machine learning model is trained to identify at least one target logo based on a received image data containing the logo features.

Consistent with another disclosed embodiment, a system for identifying a logo within a video signal includes a processor configured to execute instructions to perform operations. The operations include identifying an area containing the logo within the at least one image, extracting logo features from the area by analyzing image gradient vectors associated with the at least one image, and using a machine learning model to identify the logo from the extracted logo features, wherein the machine learning model is trained to identify at least one target logo based on a received image data containing the logo features.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure and, together with the detailed description, serve to explain the principles of the disclosure. In the drawings:

FIG. 1B shows example elements of an image frame containing a logo, consistent with disclosed embodiments.

FIG. 7B shows example approaches for identifying a region of interest that contains a logo in a video stream, consistent with disclosed embodiments.

DETAILED DESCRIPTION

Figure 1A:
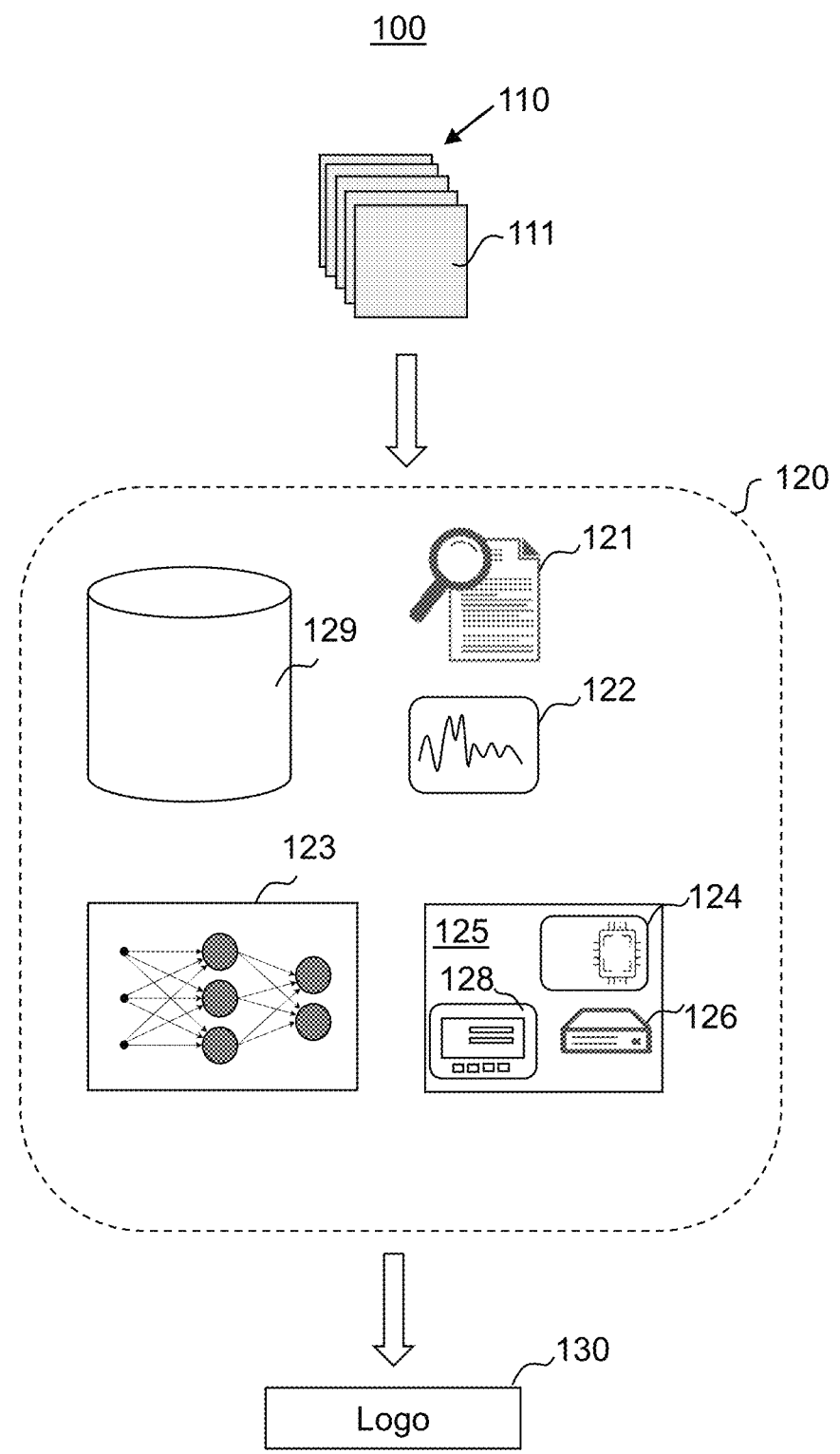
FIG. 1A is an example system for detecting a logo in a video stream, consistent with disclosed embodiments.

Reference will now be made in detail to exemplary embodiments discussed with regard to the accompanying drawings. In some instances, the same reference numbers will be used throughout the drawings and the following description to refer to the same or like parts. The disclosed materials, methods, and examples are illustrative only and are not intended to be limiting.

The disclosed embodiments relate to systems and methods for detecting a logo in multimedia content. For brevity, when discussing the multimedia content, video streaming content will be discussed and referred to as a video, a video stream, a broadcasting program, and the like, but it should be understood that multimedia content may also include images, slides, documents containing images, 3D graphical objects, texts, software codes, and the like. In various embodiments, a logo may be any image, symbol, or other design used by an organization (such as a video stream provider) to identify its broadcasting programs. The logo may include letters, numbers, symbols, images, and the like. Logos may be placed in an area of a video frame designed not to obscure the content of the video. For example, the logos may be placed in a lower or upper corner of a video stream, at a bottom or top portion of the video stream, or at sides of the video stream. Logos may be location static (i.e., may be placed at a fixed location within a video stream) or, in some cases, the logos may move during video stream playback, and may be referred to as location dynamic logos or animated logos. For example, a dynamic logo may include a running text. Logos may be color static (i.e., may include colors that do not change during video stream playback) or, in some cases, may be color dynamic (i.e., may have colors that change from one image frame to another or generally change during video stream playback). In some cases, the logos may further dynamically change size or shape and may be referred to as shape-dynamic logos (as opposed to shape-static logos that do not change shape).

In various cases, logos may contain a transparent background. In such cases, some of the pixels within a logo may not be static and may constantly change. Such logos may be more difficult to recognize using standard techniques (e.g., using conventional matching techniques for recognizing logos by comparing all the pixels in a given region of an image frame to the pixels in various known logos). Logos may further include colors at logo edges that match the color of a video stream in an area adjacent to the logo. Such situations may be challenging for various image detection algorithms.

FIG. 1 shows an example system 100 for identifying a logo in a video stream 110 formed from image frames (an image frame 111 is shown in FIG. 1). System 100 may include a computing system 120 that may receive video stream 110, process video stream 110, and output identified logo 130. In various embodiments, computing system 120 may include at least one database 129 for storing logos. Computing system 120 may include at least one processing module 125 that may include a processor 124, a memory 126 for storing instructions and various data, and an interface module 128 for controlling various aspects of processing module 125. Interface 128 may include any suitable means (e.g., touch screen, mouse, keyboard, monitor, microphone, and the like) for entering input data that can be used to control various aspects of processing module 125. In various embodiments, interface 128 may have an associated software (e.g., a voice recognition software, and the like) for processing the input data.

Computing system 120 may include various software modules configured to identify a logo within video stream 110. For example, it may include an optical character recognition application (OCR) 121, a feature extraction application 122, and an image recognition application 123.

Applications of computing system 120 allow for detecting a logo in multimedia content by first extracting one or more video frames from a video stream and then by identifying an area (also referred to as a region of interest ROI) within at least one video frame that contains the logo. In one example, the ROI can be identified by using OCR application 121 (also referred to as OCR 121 or application 121) and by applying OCR 121 for different image frames of the video stream. For example, a bottom left or right corner of the video stream may be analyzed to detect characters or symbols that may be present in the logo. In an example embodiment, a top portion of the video stream, a bottom portion of the video stream, a left or a right side of the video stream, and the like may be analyzed for the presence of the logo.

OCR 121 may include a pre-processing step or a set of steps. For example, the preprocessing steps may include de-skewing an ROI of an image frame containing the characters, converting the ROI to greyscale, removal of noise or lines, word detection, character isolation, or character segmentation, rescaling of the ROI, and the like. OCR 121 may be any suitable algorithm for detecting characters. For example, OCR 121 may include pattern matching, feature extraction (i.e., the method that decomposes a character into features such as lines, loops, and the like). In some cases, OCR 121 may include a neural network trained to recognize different characters in images.

Once an ROI is identified, image gradient vectors for the ROI may be evaluated using feature extraction application 122. The image gradient vectors refer to a directional change in the intensity or color in an image. In an example embodiment, feature extraction application 122 may use image gradient vectors to determine a gradient image, which, for example, may be generated by convolving an image (e.g., a selected image frame of a video stream) with a kernel that may be Sobel operator or Prewitt operator. In various cases, the gradient image (or, in some cases, the image gradient vectors) may be used to detect logo features such as logo edges.

The OCR approach was used to identify the ROI within a video stream, and the image gradient vectors were used to identify logo features (e.g., logo edges, logo colors, domains of a logo, and the like). However, it is understood that these methods may be combined to identify the ROI and to extract logo features. For example, image gradient vectors may be used to help identify the ROI, and OCR may be used to extract logo features.

Logo features may include logo edges, logo colors, and the like. In many instances, a logo may be defined by the outside edges—the edges that separate pixels of the logo from pixels of an image frame outside the logo, and inside edges—the edges that separate one domain of the logo from another domain of the logo. FIG. 1B illustrates some of the features of a logo 130 and parts of image frame 111. In an example embodiment, logo 130 may be located in ROI 113, as shown in FIG. 1B. Logo 130 may include symbols (e.g., a symbol 115) and letters (e.g., letter 116). Image frame 111 may include elements 112A and 112B that may be part of a background of logo 130 and may be referred to as background elements 112 (separately shown in FIG. 1B, for clarity). Background elements 112 are part of video stream 110 and may be moving from one image frame to another. Logo 130, in general, includes outside edges 114, as shown in FIG. 1B. Furthermore, logo 130 may include internal elements (e.g., element 117), which may have corresponding inside edges 118. Inside edges 118 separate one domain of logo 130 from another domain of logo 130.

Once the logo features are identified, the logo may be preprocessed. In an example embodiment, preprocessing steps may be executed by the feature extraction application 122. In an example embodiment, a logo may be converted to a black-and-white image, or/and the logo may be overlaid over a uniformly colored background (e.g., light background for a dark logo and dark background for a light logo). A step (or multiple steps) of logo preprocessing may also be referred to as the extraction of logo features. In some cases, extraction of logo features may include removing a noise (e.g., small features such as dots, small lines, and the like) in the vicinity of the logo, smoothing out some of the high curvature regions (e.g., smoothing sawtooth lines, sharp edges, and the like), smoothing sharp variations in color, and/or connecting lines that include small interruptions. Further processing may include detecting variations in thicknesses of lines forming the edges of the logo (particularly if such variations occur over a short portion of a line), and removing such variations or smoothing such variations.

In some cases, feature extraction application 122 may identify a set of manipulative actions $A=\{a_1, a_2, \ldots a_N\}$ that may be implemented for improving the representation of the logo and use at least some of the actions for improving the representation of the logo. The manipulative actions may include any suitable preprocessing steps, as discussed above, such as noise removal, smoothing of lines, smoothing of colors, and the like.

In various embodiments, whether a logo is light or dark may be established using any suitable approaches. For example, statistical characteristics for a logo may be calculated by feature extraction application 122, such as an average color for the logo, an approximation for a ratio of the logo edge length to a square root of a logo area (a choice of square root for a logo area is only one possible example, and any other suitable measure function for the logo may be used), an average curvature for the logo edge, a standard deviation of the average curvature calculated for the logo edge, a standard deviation for the logo color, or any other suitable statistical quantities for the logo. In some cases, several statistical quantities may be calculated for the logo, and these quantities may form a logo statistical vector S. For example statistical vector $S=\{s_1, s_2, \ldots s_N\}$ may include $s_1$—the average color of the logo, $s_2$—a standard deviation of the color of the logo, and $s_N$—a ratio of an estimated logo edge length to a square root of an estimated logo area.

In various embodiments, statistical vector S may be calculated for several image frames. For example, $S^i$ may be calculated for the $i^{th}$ image frame. Another statistical quantity IS may be used to determine how $S^i$ changes from one frame to another. For example, IS may include an average of $S^i$, $\overline{S}^i=\{\overline{s}_1, \overline{s}_2 \ldots \overline{s}_N\}$ computed over multiple image frames, a standard deviation for $S^i$, stdev($S^i$), and the like. For example, IS={$\overline{S}^i$, stdev($S^i$) . . . }. For example, if stdev($S^i$) is significant, for accurate determination of the logo, more frames may need to be analyzed. It should be noted that statistical vector S may be calculated once logo features are identified and extracted, as the extraction of the logo features at least attempts to isolate the logo from the video stream that is being overlaid by the logo. Entities of statistical quantity IS (e.g., $\overline{S}^i$) may be compared with corresponding statistical quantities for different logos selected from database 129 in order to determine a subset of known logos that can match the logo that is being identified.

Figure 1C:
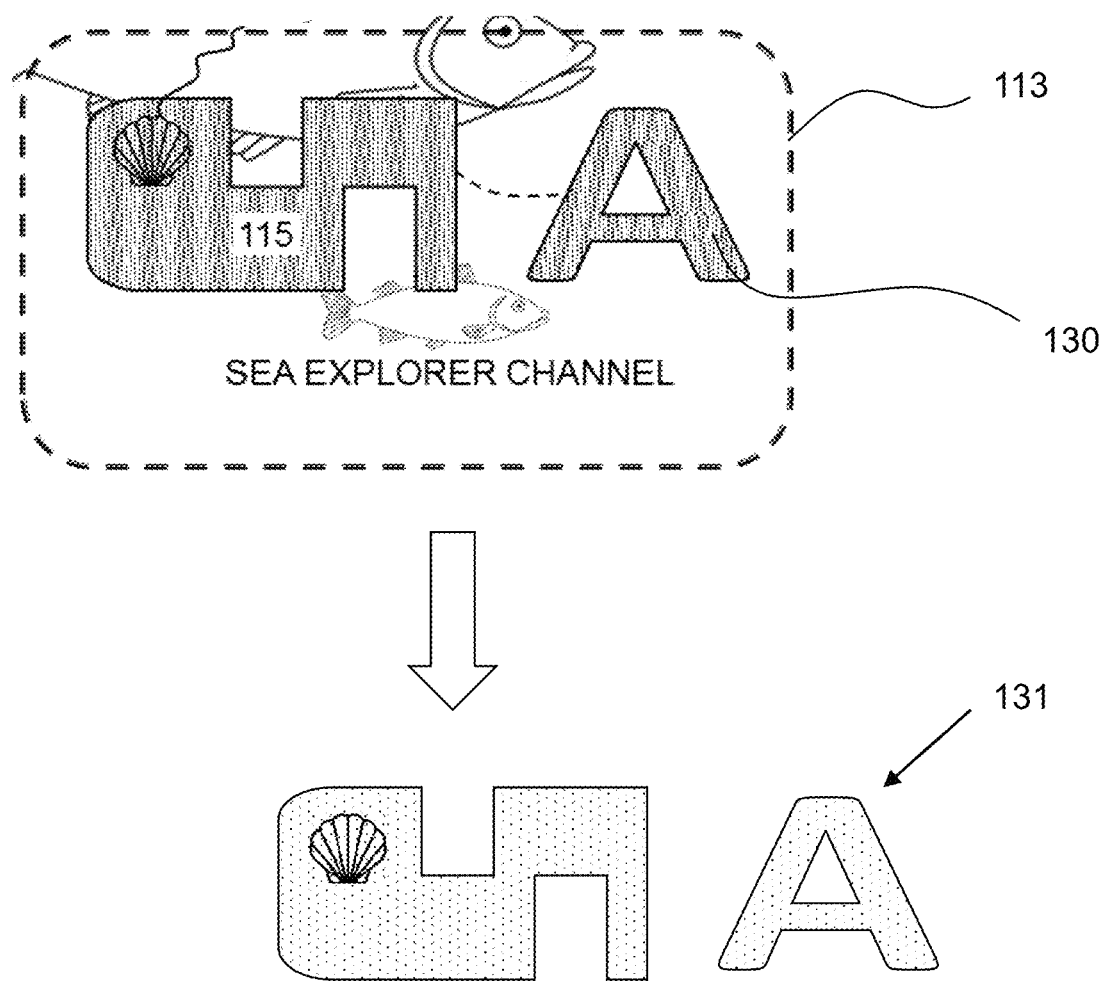
FIG. 1C shows an example region of interest that contains a logo, and an image corresponding to extracted logo features, consistent with disclosed embodiments.
Figure 1D:
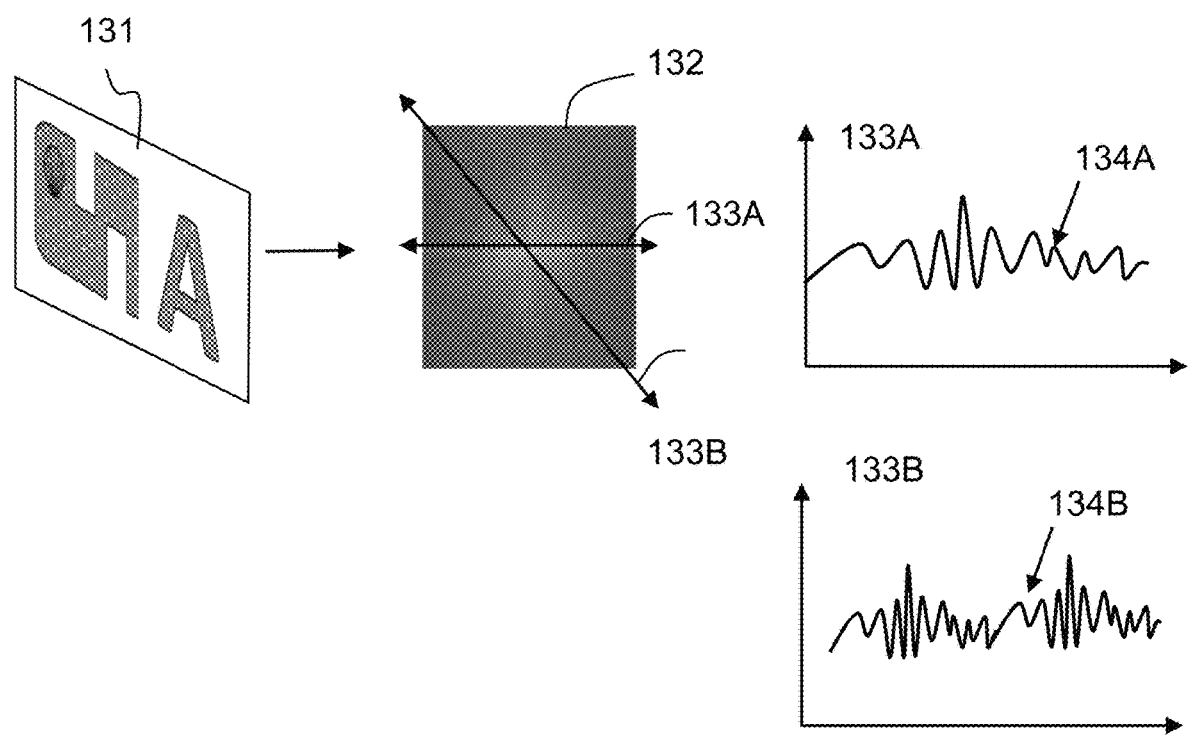
FIG. 1D shows an example transform of an image containing a logo, consistent with disclosed embodiments.

In some embodiments, extracted logo features may represent an image that can be further analyzed. FIG. 1C shows, for example, ROI 113 containing logo 130, and a set of extracted features represented by an image 131 for logo 130 obtained after processing ROI 113 with feature extraction application 122. As mentioned above, one of the analyses may involve calculating various statistical parameters for image 131 (e.g., $s_N$ as defined above). Alternatively, image 131 may be further processed. In an example embodiment, image 131 may be decomposed using singular value decomposition (SVD), or, as shown in FIG. 1D, the image may be decomposed in a frequency domain as shown by a two-dimensional region 132. One-dimensional cross-sectional cuts 133A and 133B are illustrated by double arrows plotted over region 132, and corresponding one-dimensional Fourier transforms 134A and 134B are shown adjacent to region 132. In an example embodiment, Fourier transforms may be applied to various logos stored in database 129, and compared with a Fourier transforms 134A and 134B using feature extraction application 122. When a match is found between the Fourier transform of at least one logo of database 129 and one of the Fourier transforms of image 131 (e.g., transform 134A), application 122 may identify logo 130. In some cases, a comparison of data obtained from transforming image data (e.g., data obtained using Fourier transforms, SVD, and the like) of image 131 and logos stored in database 129 may be one of the steps for identifying the logo.

Figure 2:
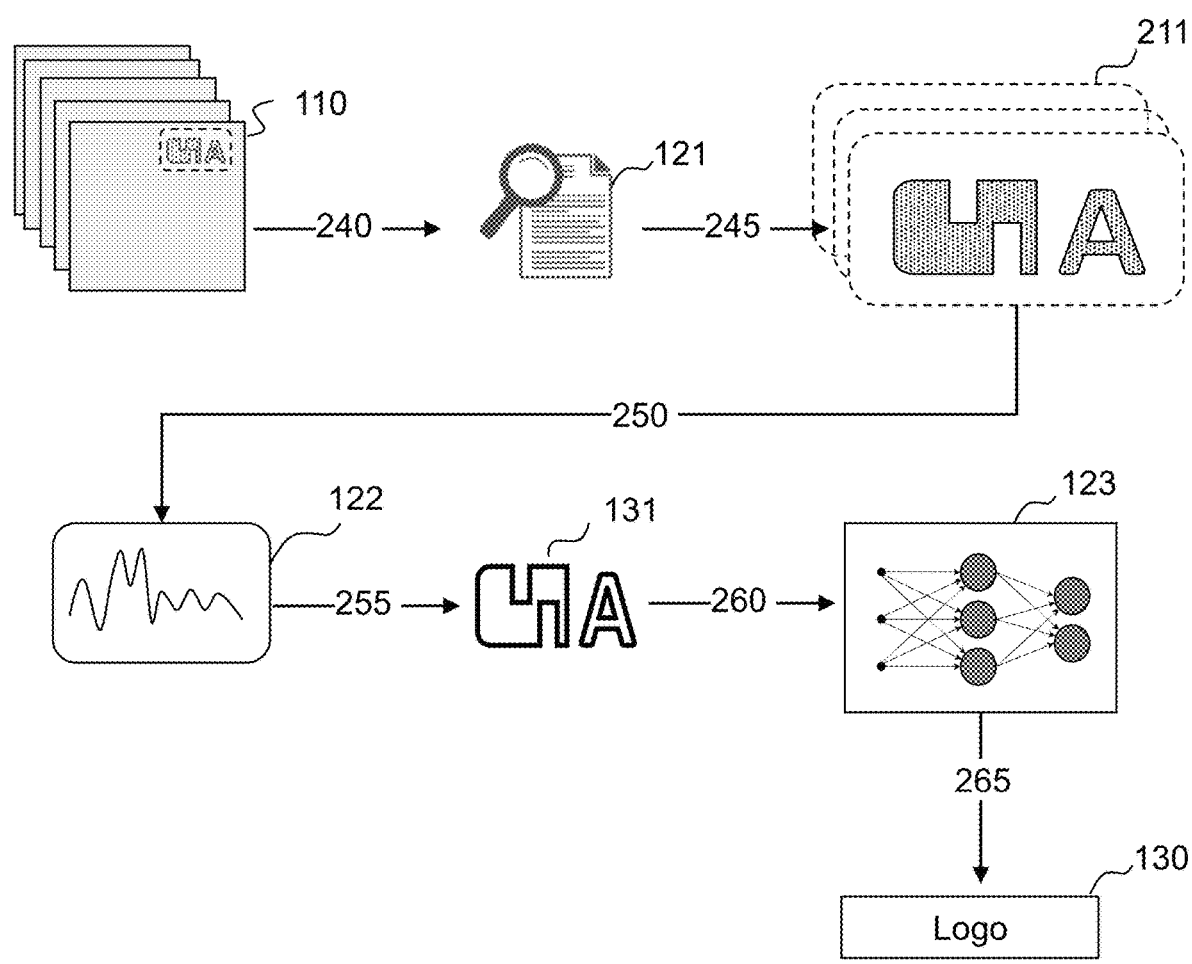
FIG. 2 is an example process of detecting a logo, consistent with disclosed embodiments.

FIG. 2 illustrates an example process 200 of identifying logo 130 using OCR application 121, feature extraction application 122, and image recognition application 123. At step 240 of process 200, multiple frames of video stream 110 are received by OCR application 121 for identifying ROI 113 (as shown in FIG. 1B, for example). At step 245 of process 200, OCR application may identify, for several image frames of video stream 110, corresponding ROIs 211 that may be candidates for containing a logo. At step 250, ROIs 211 of image frames of video stream 110 may be analyzed by feature extraction application 122, and at step 255, image 131, corresponding to extracted features of the logo, is output by extraction application 122. In some cases, application 122 may output more than one image 133. For example, application 122 may output image 131 for each ROI from ROIs 211. At step 260, image 131 may be input to image recognition application 123, and at step 265 of process 200, image recognition application 123 may identify logo 130.

Image recognition application 123 may be any suitable application that can compare image 131 with images of logos stored in database 129 to identify logo 130. In an example embodiment, image recognition application 123 may be a CNN or any other suitable neural network model. Because image 131 does not include any background elements (e.g., elements 112, as shown in FIG. 1B), image 131 may be accurately identified by an appropriate neural network model. In some embodiments, the content processing system may include multiple machine learning models (e.g., multiple neural network systems) capable of interacting with one another. For example, machine-learning models may include neural networks, recurrent neural networks, convolutional neural networks, generative adversarial networks, decision trees, and models based on ensemble methods, such as random forests, generative adversarial network (GAN), or an information-theoretic extension to the GAN (InfoGAN).

In some embodiments, feature extraction application 122 may be trainable (e.g., application 122 may include a neural network model with adjustable weights). Additionally, or alternatively, application 122 may have various parameters that may be adjusted to improve feature extraction for different logos. In some cases, for example, parameters of feature extraction application 122 may be selected to extract features for a set of logos. For example, a video stream provider (e.g., MSNBC) may want to analyze video streams and detect only an MSNBC logo. For instance, MSNBC may want to prevent other parties from broadcasting MSNBC copyrighted video streams. For such a case, parameters of feature extraction application 122 may be configured to improve the extraction of MSNBC logos.

Figure 3A:
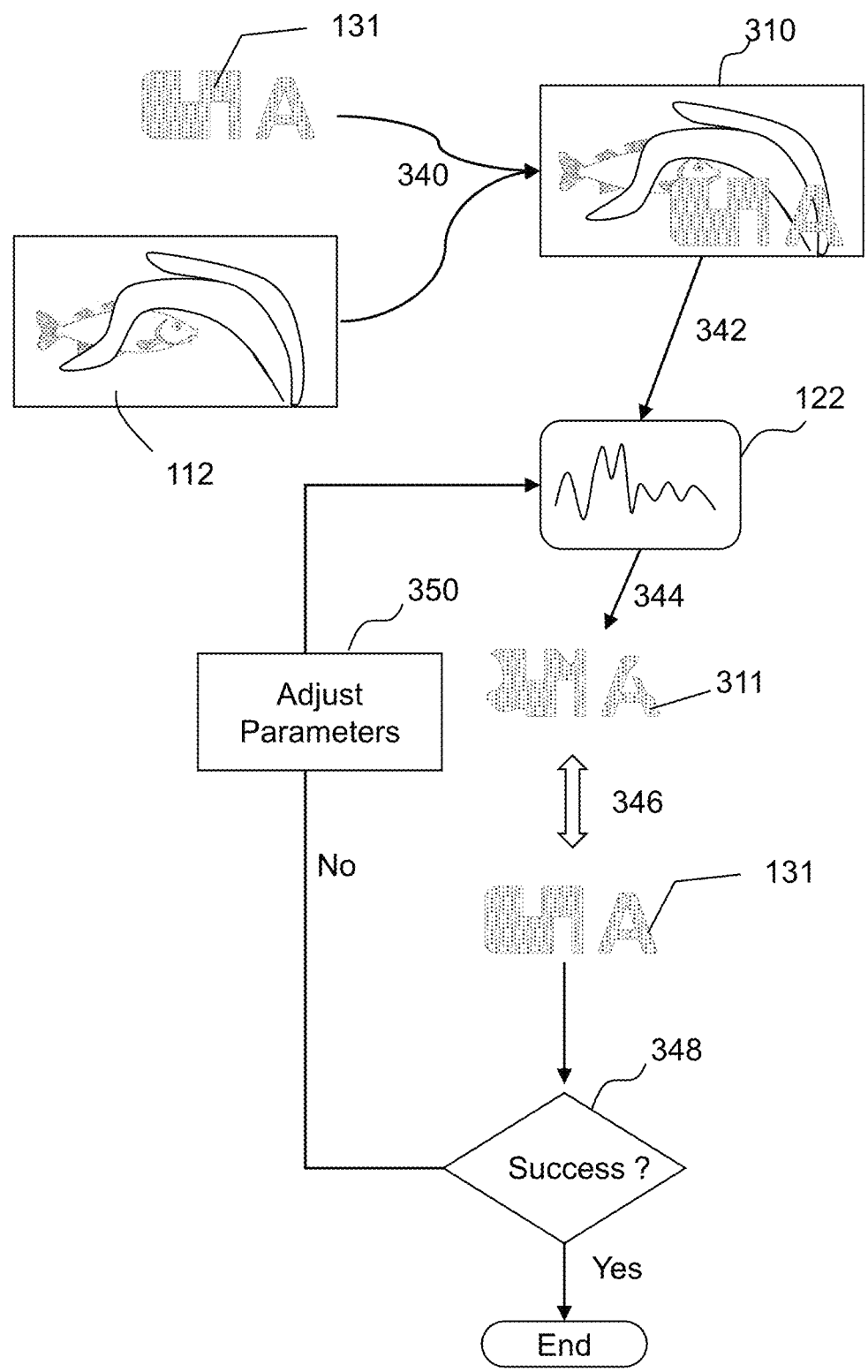
FIGS. 3A-3B show example steps of adjusting parameters of a feature extraction application, consistent with disclosed embodiments.
Figure 3B:
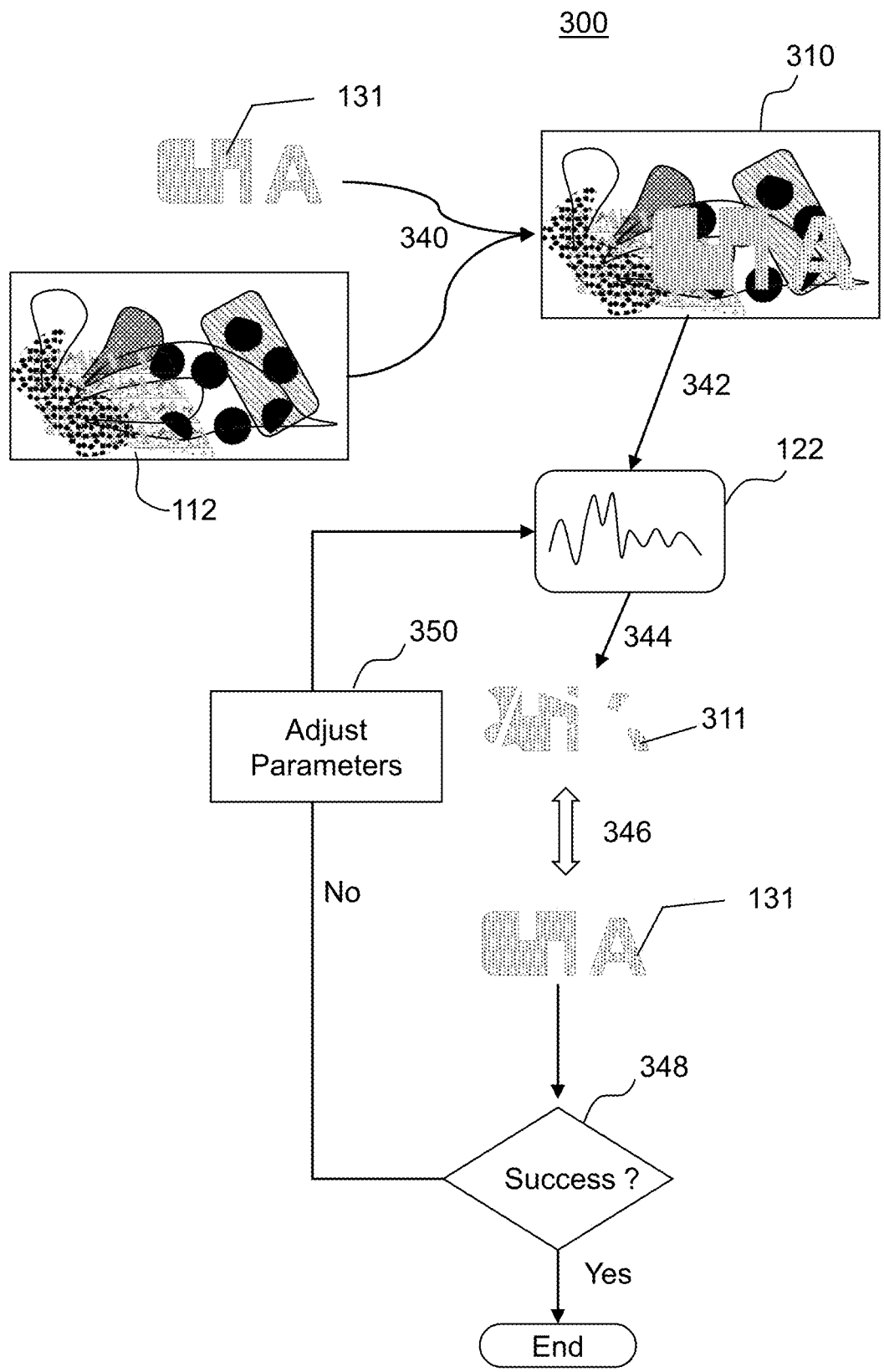

In various embodiments, parameters of feature extraction application 122 may be adjusted by using a feedback approach, as shown, for example, by process 300 depicted in FIGS. 3A and 3B. In an example embodiment, as shown in FIG. 3A, image 131 of a logo is combined with example background elements 112 at step 340 of process 300, resulting in a combined image 310 that corresponds, for example, to image data of ROI 113, as shown in FIG. 1A. Example background elements 112 may be any suitable elements. For example, FIG. 3A shows representative elements that may be found in a video stream, while FIG. 3B shows artificially fabricated background elements 112 that may include different shapes of varying texture and color. At step 342, image 113 may be processed by feature extraction application 122, and at step 344, application 122 may generate an image 311 that includes extracted logo features. In various embodiments, image 311 and original image 131 may be compared at step 346, and if the comparison is successful (step 348, Yes), process 300 may be completed (at least for a given choice of background elements 112). Alternatively, if the comparison is not successful (step 348, No), process 300 may proceed to step 350, and parameters of feature extraction application 122 may be adjusted. For instance, instead of using a Sobel operator, a Prewitt operator may be used for edge detection. Other parameters determining continuity and smoothness of the lines may be adjusted as well at step 350. In various embodiments, steps 344, 346, 348, and 350 may be repeated either until successful comparison (step 348, Yes) or until a maximum number of repetitions have been used.

As shown in FIG. 3A, image 311 may be a good representation of image 131 and may result in a successful comparison in step 348. FIG. 3B shows an example of logo-extracted features that resulted in image 311 having a poor quality. Such an image may not compare well with original image 131. In various embodiments, comparison of image 311 and image 131 may be based on a match score that may, for example, range between zero and one. If the match score is above a predetermined threshold value, comparison of image 131 and image 311 may be determined to be successful, and if the match score is below a predetermined threshold value, comparison of image 131 and image 311 may be determined to fail. In various embodiments, the comparison of image 131 and image 311 may be evaluated using any suitable approaches. For example, machine-learning models such as neural networks, recurrent neural networks, convolutional neural networks, generative adversarial networks, decision trees, and models based on ensemble methods, such as random forests, may be used.

FIG. 4A shows an example process 400 for extracting logo features using multiple image frames A-C of video stream 110. At steps 250A-250C of process 400, logo features with images A1-C1 may be extracted using feature extraction application 122, with images A1-C1 corresponding to image frames A-C. Images A1-C1 may have deficiencies (i.e., regions with incorrect or missing features) indicated by regions A11, A12, B11, and C11. As can be seen in FIG. 4A, image A1 may have deficiency A11 that prevents the resolution of a front portion of the logo, while image B1 may have that portion of the logo resolved. In various embodiments, feature extraction application 122 may be configured to select a sufficient number of image frames (e.g., image frames A-C), such that, after superimposing images A1-C1 in step 255, a well-resolved image 131 may be obtained that represents all the extracted features of logo 130, such that identification of logo 130 is possible.

Figure 4:
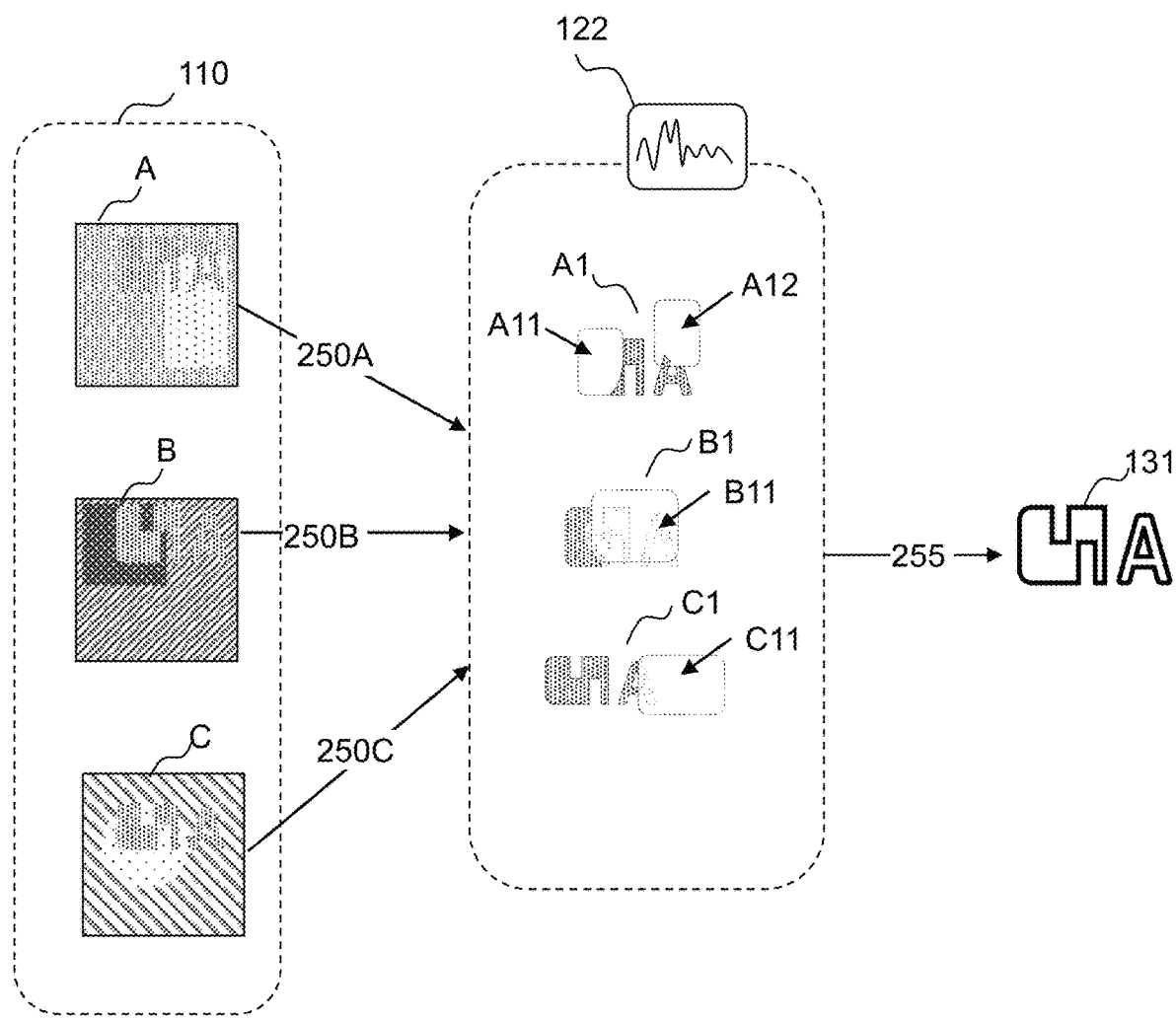
FIG. 4 is an example diagram of detecting a logo using multiple image frames of a video stream, consistent with disclosed embodiments.
Figure 5:
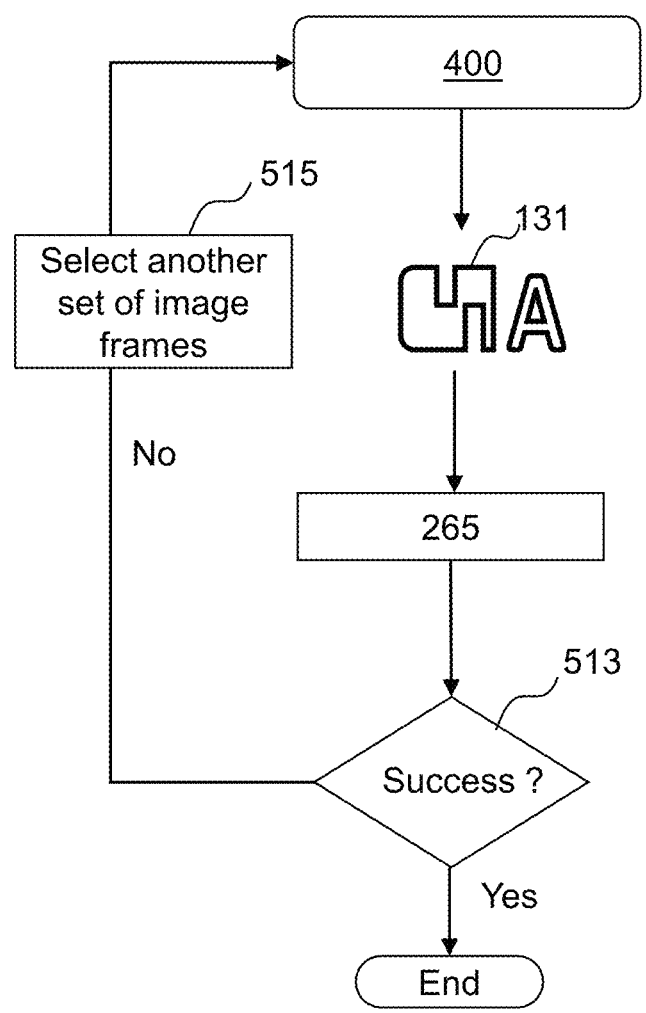
FIG. 5 is an example process of selecting a set of image frames for identifying a logo, consistent with disclosed embodiments.

In some embodiments, process 400 may be combined with an image recognition step (e.g., step 265 of process 200, as shown in FIG. 2), using a feedback loop, as shown in FIG. 5. For example, FIG. 5 shows a process 500 for identifying a logo. The first step of process 500 may be process 400, as shown in FIG. 4. Process 400 returns image 131 representing a logo. Image 131 may be used by image recognition application 123 at step 265 to identify a logo. For example, the logo may be identified by comparing image 131 with various logo images in database 129 of computing system 120. In various cases, as described above, the comparison may be facilitated by a machine-learning model. The machine-learning model may return a recognition score (e.g., a number between 0 and 100), indicating whether image 131 has been recognized. The recognition score may be associated with a probability of the logo being recognized. For example, if image 131 is recognized with a large degree of certainty, the recognition score may be high, and if image 131 is not recognized, the recognition score may be low. If the recognition score is above a predefined threshold value, image recognition application 123 may conclude that a logo is successfully recognized (step 513, Yes), and process 500 may be terminated. Alternatively, if the recognition score is below the predefined threshold value, image recognition application 123 may conclude that the logo is not recognized (step 513, No), and process 500 may proceed to step 515. At step 515, computing system 120 may be configured to select a different set of image frames. The different set of image frames may have a larger number of image frames and/or different image frames than the ones initially selected to obtain image 131. Steps of process 500 may then be repeated until the logo is successfully recognized or until a maximum number of iterations is reached.

Figure 6:
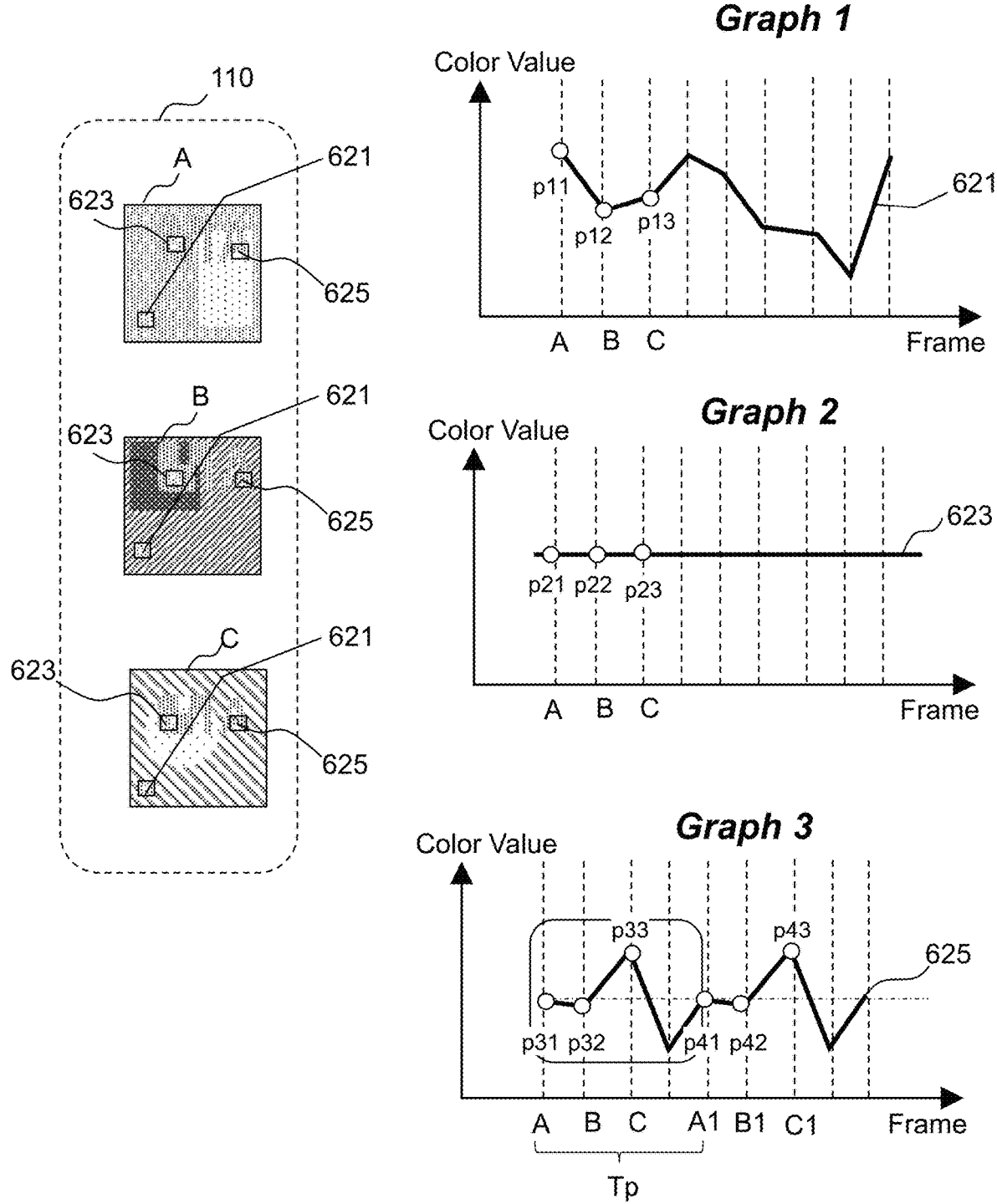
FIG. 6 is an example diagram of detecting a logo using a time-dependent variation of pixels of a video stream, consistent with disclosed embodiments.

FIG. 6 shows that colors of pixels at various locations in multiple image frames (e.g., frames A-C, as shown in FIG. 6) may be analyzed to see if the colors change from one frame to another. FIG. 6 shows example pixels 621 and 623 at two different locations in frames A-C. As shown by graph 1 of FIG. 6, color values of pixel 621 may change from one frame to another as indicated by points p11, p12, and p13, which have different color values for frames A, B, and C. Alternatively, graph 2 of FIG. 6 shows color values for pixel 623. As indicated by points p21, p22, and p23, the color values for frames A, B, and C are the same for these pixels. In an example embodiment, if pixel colors do not change from one frame to another, such pixels (in some cases) may correspond to pixels forming a logo. In some cases, color values for an example pixel (e.g., pixel 625) may change in a periodic way as shown, by graph 3 of FIG. 6. For example, points p41, p42, and p43 for image frames A1-C1 have the same color values as respective points p31, p32, and p33 for image frames A-C. The color fluctuation of pixels may have a well-defined period (e.g., $T_p$, as shown in FIG. 6, graph 3), and such fluctuation may indicate that pixel 625 belongs to an animated logo (i.e., a logo that moves or changes color during playback of a video stream). In various embodiments, feature extraction application 122 may identify all the pixels that either do not change color or change color periodically, as discussed above, and determine an image region formed from such pixels as a possible region (ROI 113) for containing a logo. It should be noted that in general, pixels may maintain a constant value and not be part of a logo. For example, the background of a news channel may contain regions that do not change color from one image frame to another.

Figure 7A:
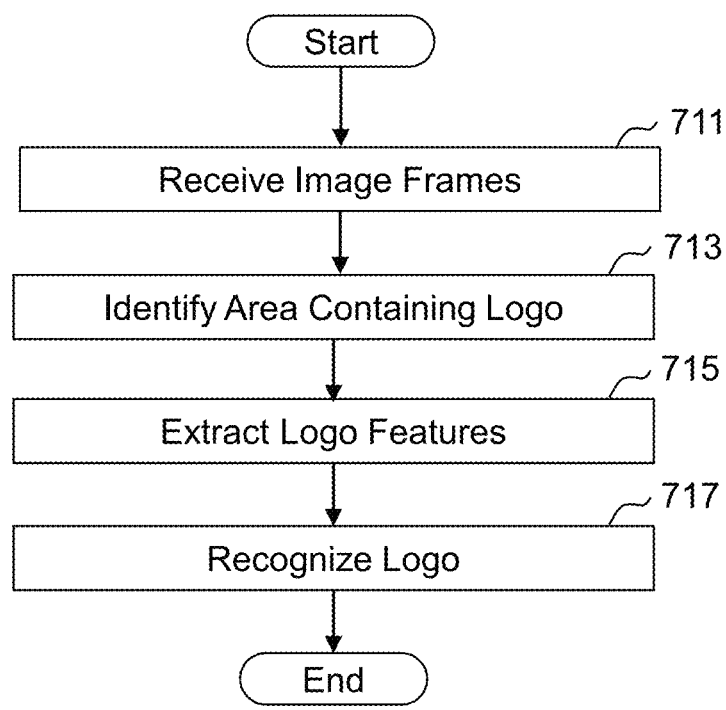
FIG. 7A is an example flowchart for detecting a logo in a video stream, consistent with disclosed embodiments.

FIG. 7A shows example key steps of a process 700 for recognizing a logo. At step 711, computing system 120 is configured to receive image frames of video stream 110. In an example embodiment, computing system 120 may be operated by a party that would like to identify video streams that contain logos. For example, the party may be a broadcast provider (e.g., MSNBC), and the broadcast provider may use computing system 120 to identify video streams, containing a logo of the provider, that are broadcast illegally by other parties. In an example embodiment, the broadcast provider may include a web crawler that may access at least some portions of various video streams (e.g., the web crawler may crawl websites (e.g., YouTube) that stream video content), and may provide the portions of various video streams to computing system 120 for identifying logos within image frames of the portions of various video streams.

At step 713, computing system 120 may identify an area of a selected image frame that contains a logo (ROI 113, as shown in FIG. 1B). As described above, the area may be identified using OCR application 121. In an example embodiment, OCR application 121 returns an ROI score that determines a likelihood that ROI 113 is correctly identified. In an example embodiment, if the ROI score is high (i.e., above a predetermined threshold), then ROI 113 is correctly identified. Alternatively, if the ROI score is low (i.e., below a predetermined threshold), then ROI 113 may not be correctly identified. In case OCR application 121 fails to identify ROI 113, a different image frame may be chosen, and step 713 may be repeated. In an example embodiment, if several attempts to identify ROI 113 fail, but all of the attempts result in the same ROI 113 (e.g., all attempts to identify ROI result in an indication that a logo is located in a lower-right corner of a video stream) OCR application 121 may still consider the identified ROI 113, by virtue of several attempts pointing to the same region of the video stream as containing the logo.

If ROI 113 cannot be identified by OCR application 121, computing system 120 may be configured to select a region of a video stream that has a high likelihood of containing a logo. For example, if the objective is to identify an MSNBC logo in a video stream, the logo is expected to be located in a lower-right corner of the video stream, and such a region is selected as ROI 113. Similarly, if, for example, the Fox News Channel logo needs to be identified, such a logo is expected to be located in a lower-left corner of the video stream, and the lower-left corner is selected as ROI 113.

The information related to the expected logo (e.g., the size and location of the expected logo) may be used to further identify bounds of ROI 113. For example, the MSNBC logo may be about one-fifth of the height of the video stream, may be one-eight of the width of the video stream and may be located slightly to the left of the rightmost boundary of the video stream (e.g., about one-seventeenth of the width of the video stream to the left of the rightmost boundary) and may be located slightly above the bottom boundary of the video stream (e.g., about one-tenth of the height of the video stream above the bottom boundary).

Alternatively, if OCR application 121 identifies ROI 113 as a lower-right corner of a video stream, then knowing that the Fox News Channel logo is located in a lower-left corner of the video stream, OCR application 121 may rule out that a logo may be the Fox News Channel logo.

In various embodiments, OCR application 121 may be used to detect characters that may be part of a logo. In some cases, OCR application 121 may detect more than one instance of characters within an image frame of a video stream. If any of the detected characters are related to a name of a broadcast provider, a broadcast channel, or an operator, OCR application 121 may select ROI 113 that may be, for example, a bitmap of a region that contains the detected characters.

If OCR application 121 is not successful at identifying ROI 113, OCR application 121 may then estimate a location and size of ROI 113. For example, OCR application 121 may suggest to feature extraction application 122 that ROI 113 is located at a lower-right corner, at a lower-left corner, at a top-right corner, or at a top-left corner. Alternatively, OCR application 121 may suggest to application 122 that ROI 113 is located at a bottom portion of the video stream, at a top portion of the video stream, at a left side of the video stream or at the right side of the video stream. In various embodiments, OCR application 121 may prioritize suggestions based on the likelihood of finding ROI 113. For example, if the likelihood of finding a logo in the lower-right corner of the video stream is higher than the likelihood of finding the logo anywhere else in the video stream, OCR application 121 may suggest lower-right corner as a location of the logo.

In various embodiments, OCR application 121 may identify characters and symbols within at least one image frame of a video stream using OCR application 121, and then use several different approaches for determining ROI 113 that contains the identified characters/symbols. The various approaches are schematically illustrated in FIG. 7B. In a first approach (FIG. 7B, Approach 1), ROI 113 is selected, such that identified logo characters are contained within ROI 113. For example, ROI 113 may be a box selected to include the identified logo characters 730, as shown in FIG. 7B.

In another example embodiment (FIG. 7B, Approach 2), ROI 113 may be determined by centering ROI 113 at a location 740 where one or more logo characters are identified. For example, OCR application 121 may identify a leftmost boundary 731 of logo characters (and/or symbols) 730, a rightmost boundary 733 of characters 730, and a height H of characters 730 (i.e., distance from a bottom boundary 735 and a top boundary 737 of characters 730). Application 121 may further determine a distance W being the distance between leftmost 731 and rightmost 733 boundary. Further application 121 may determine the location of center 740 as a distance W/2 from leftmost boundary 731 and distance H/2 from bottom boundary 735. ROI 113 may then be determined to be located at center 740 and have a width $W_r$ and a height $H_r$, as shown in FIG. 7B. In various embodiments, $W_r > W$, and $H_r > H$.

In another example embodiment (FIG. 7B, Approach 3), ROI 113 may be placed at a corner of an image frame, and may be selected to be sufficiently large to contain characters 730, as shown in FIG. 7B. Alternatively, in another example embodiment (FIG. 7B, Approach 4) ROI 113 may be determined as a region located at an expected location of the logo. For example, for Fox News Channel, the expected location of the logo is in the lower-left corner, and ROI 113 is determined to be a region at the lower-left corner (as shown, for example, in FIG. 7B, Approach 4).

In an example embodiment, OCR application 121 may determine ROI 113 by analyzing how colors of various pixels of a video stream change from one image frame to another (FIG. 7B, Approach 5). For example, if the colors of pixels 742, as shown in FIG. 7B, do not change from one image frame to another (i.e., the pixels have a constant color value) such pixels may belong to a logo. In some cases, the pixels may belong to the logo if the color value for the pixels changes periodically when evaluated for consecutive image frames, as was previously described. For such cases, OCR application 121 may identify ROI 113 as an area that contains pixels that either have a constant color value or have the color value that changes periodically.

In various embodiments, different steps of approaches 1-5 may be combined. For example, constant color value pixels may be determined using a step of approach 5, and the boundary of ROI 113 may be determined using steps of approach 2. For instance, center point 740, width W, and height H may be determined for a group of pixels that have a constant color value.

Returning to FIG. 7A, after identifying a possible region containing the logo (i.e., identifying ROI 113), at step 715 of process 700, feature extraction application 122 may be used to extract features that may be used for identifying the logo. Feature extraction may be particularly important for logos that can be animated or include transparent areas with background elements (e.g., elements 112, as shown in FIG. 1B) that may change color. As described above, in connection with processes 400 and 500, multiple image frames may be needed for determining logo features. In some cases, when a single image frame does not contain a logo that has good contrast with background elements 112, ROI 113 containing the logo may be subdivided into areal segments and use different image frames for resolving the logo in the subdivided areal segments. Using multiple image frames is particularly useful for poor quality video streams (e.g., pirated/copied video streams, such as video streams that are copied using a camcorder).

As described above, the features may be extracted using image gradient vectors. In some cases, a histogram of oriented gradients may be used as a feature extraction tool. In an example embodiment, edges may be determined at places where there is a large discontinuity in image color. The edges may be detected using any suitable methods such as search-based methods that may compute a measure of edge strength, that may be, for example, a first-order derivative expression such as the gradient magnitude. The search-base methods may then searching for local directional maxima of the gradient magnitude and determine a direction of the edge as a line perpendicular to the local directional maximum. As a pre-processing step to edge detection, a smoothing stage (e.g., a Gaussian smoothing), may be applied (see also noise reduction). The edge detection methods may use any suitable smoothing filters and may compute the measure of the edge strength in any suitable way. In various embodiments, a suitable edge detection method may rely on the computation of image gradients vectors. At the completion of step 715, feature extraction application 122 may return an image of a logo that includes features of the logo (e.g., outside edges of the logo, colors of the logo, internal edges in the logo, and the like).

At step 717, the image of the logo (e.g., image 131, as shown, for example, in FIG. 1C) returned by feature extraction application 122 may be analyzed by image recognition application 123. As described above, image recognition application 123 may be any suitable application that can compare image 131 with images of logos stored in database 129 to identify logo 130. In an example embodiment, image recognition application 123 may be a machine-learning model such as CNN or any other suitable neural network model. In an example embodiment, machine-learning model may be a support vector machine.

Figure 8A:
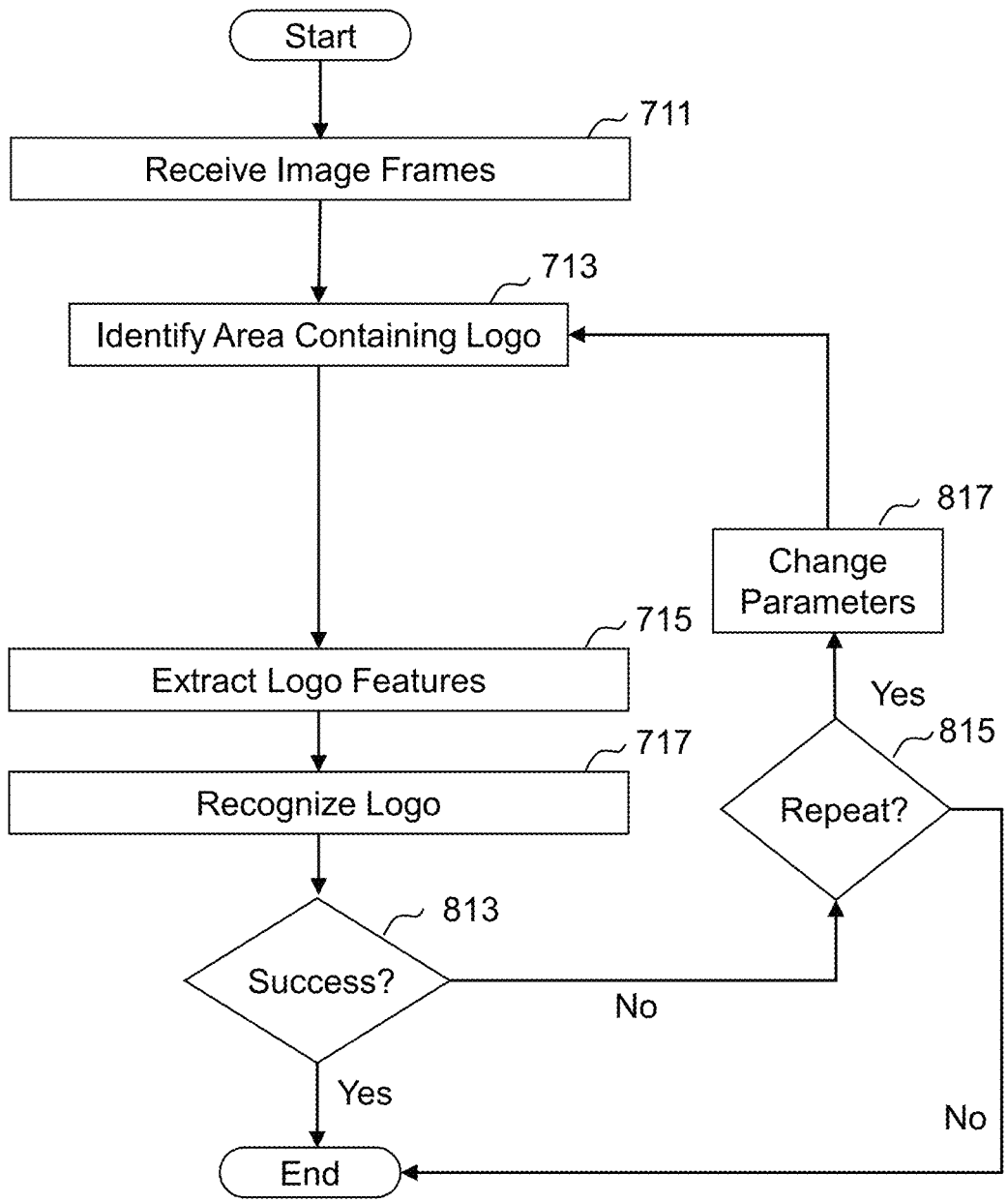
FIGS. 8A-8D are example flowcharts for detecting a logo in a video stream, consistent with disclosed embodiments.

FIGS. 8A-8D show respective processes 800-803 that may be variations of process 700, as shown in FIG. 7A. For example, FIG. 8A shows process 800 that includes steps 711-717 that may be the same as the same numbered steps of process 700. At step 813 of process 800, image recognition application 123 may determine if a logo is correctly recognized, as discussed above. If the logo is correctly recognized (step 813, Yes), process 800 may be complete. However, if the logo is not recognized (step 813, No), process 800 may proceed to step 815, at which the decision is made whether or not to repeat steps 713-717 of process 800. If at step 815 it is determined that steps 713-717 may be repeated (step 815, Yes), process 800 may proceed to step 817, where parameters for determining ROI 113 for a given image frame may be adjusted, and a new ROI 113 may be determined. For example, the parameters for determining ROI 113 may include a height of ROI 113, a width of ROI 113, a location of ROI 113 within an image frame of the video stream. In some cases, a location (or a size) of ROI 113 may change from one image frame to another as the logo may be animated. In some embodiments, adjusting parameters in step 817 may include selection of approaches 1-5 as illustrated in FIG. 7B and discussed above. For example, during a first pass through steps 711-715, one of approach 1, approach 2, or approach 3 may be used. If the logo is not recognized (step 813, No) (i.e., if the recognition score is below a threshold value, as described above), approach 4 may be used to determine ROI 113 during a second pass through steps 711-715. The above example is only illustrative, and other combinations of approaches 1-5 may be used. For example, during the first pass through steps 711-715, approach 1 may be used, and if the logo is not recognized (step 813, No), approach 2 or approach 3 may be used to determine ROI 113 during a second pass through steps 711-715. In some cases, approach 4 or approach 5 may be used during the third pass through steps 711-715, when, after the second pass, the logo is not recognized.

After adjusting logo parameters at step 817, process 800 may proceed to step 713. If at step 815 it is determined that steps 713-717 may not be repeated (step 815, No), process 800 may be ended. In an example embodiment, steps 713-717 may be determined not to be repeated if the maximum number of repetitions is reached.

Figure 8B:
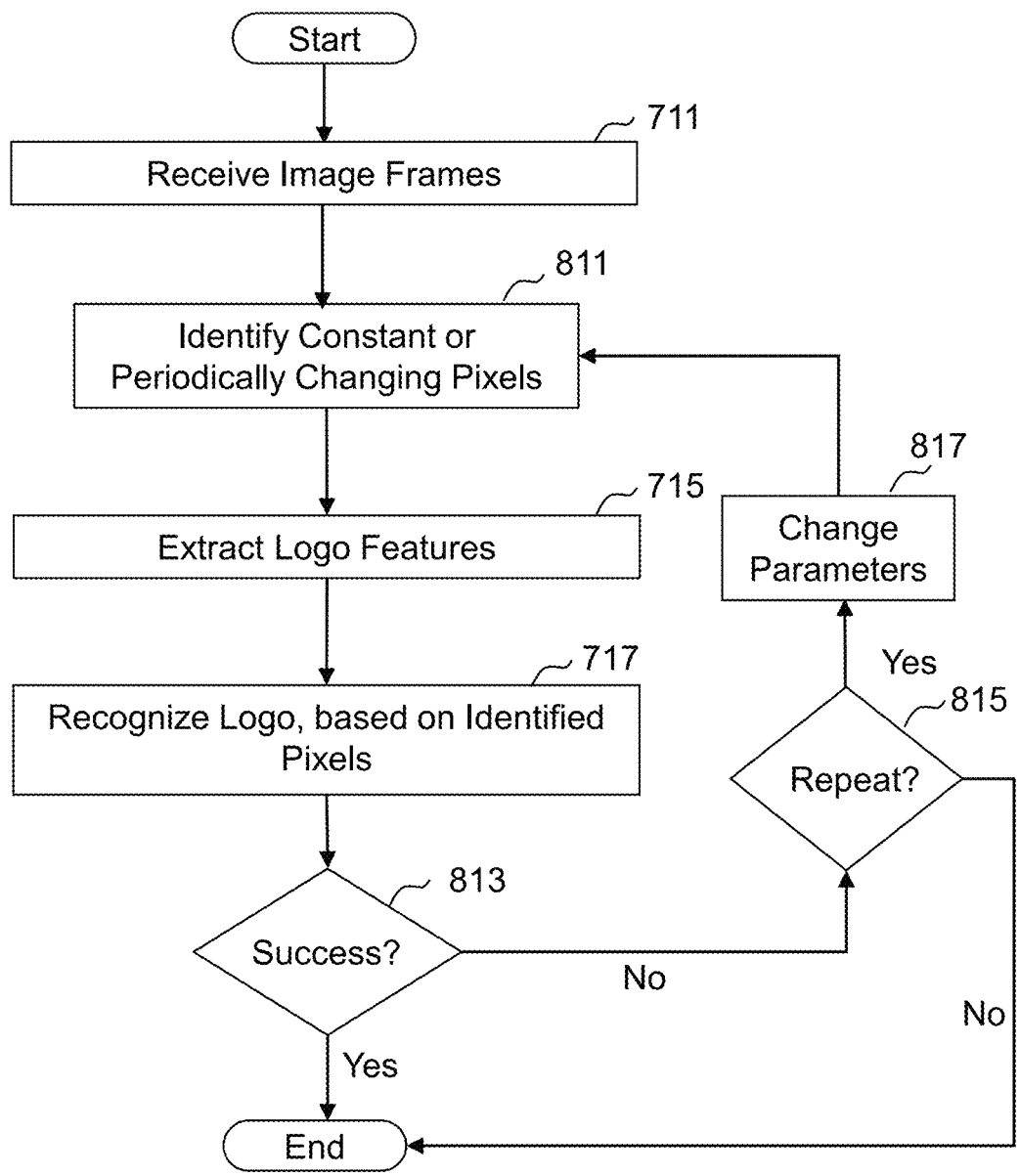

FIG. 8B shows a process 801 that is a variation of process 800. Process 801 includes all the steps of process 800 (i.e., the same numbered steps of process 801 are the same as the corresponding steps of process 800) with the exception of a new step 811 and step 713 being omitted. New step 811 may represent approach 5 (see FIG. 7B) that is used for determining ROI 113. In some embodiments, when step 811 is present, step 715 may be omitted as well.

Figure 8C:
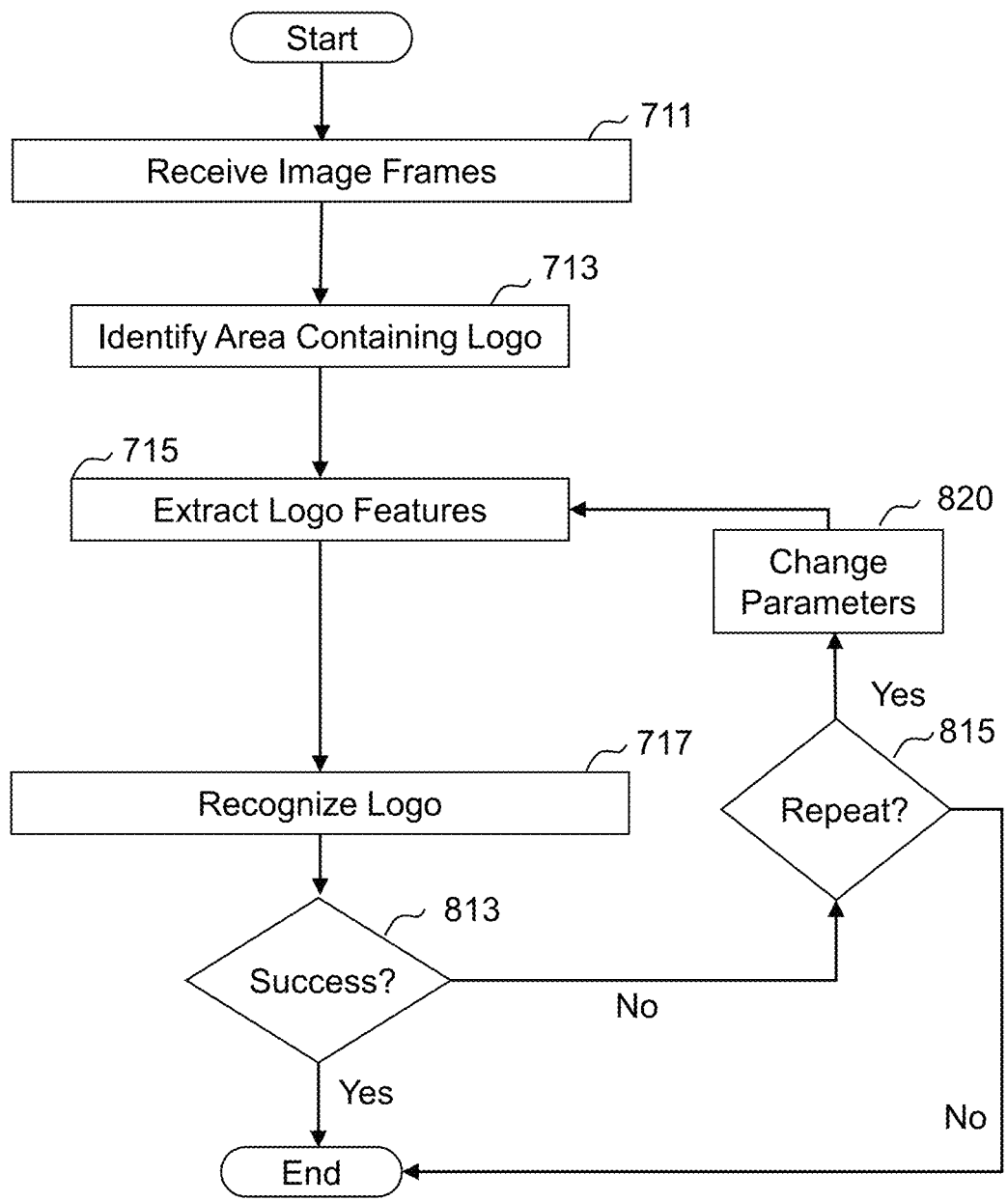

FIG. 8C shows a process 802 that is a variation of process 800. The same numbered steps of process 802 are the same as the corresponding steps of process 800. Additionally, instead of step 817 of process 800, process 802 may include a step 820 that is used to adjust parameters of step 715 used for extracting logo features. For example, the parameters used in step 715 may include a selection of edge detection algorithms, a selection of smoothing algorithms, a modification of preprocessing steps, and the like. In some cases, a set of manipulative actions, as described above, may be selected at step 820 and implemented for improving the representation of the logo. As mentioned above, the manipulative actions may include any suitable preprocessing steps, as discussed above, such as noise removal, smoothing of lines, smoothing of colors, and the like.

Figure 8D:
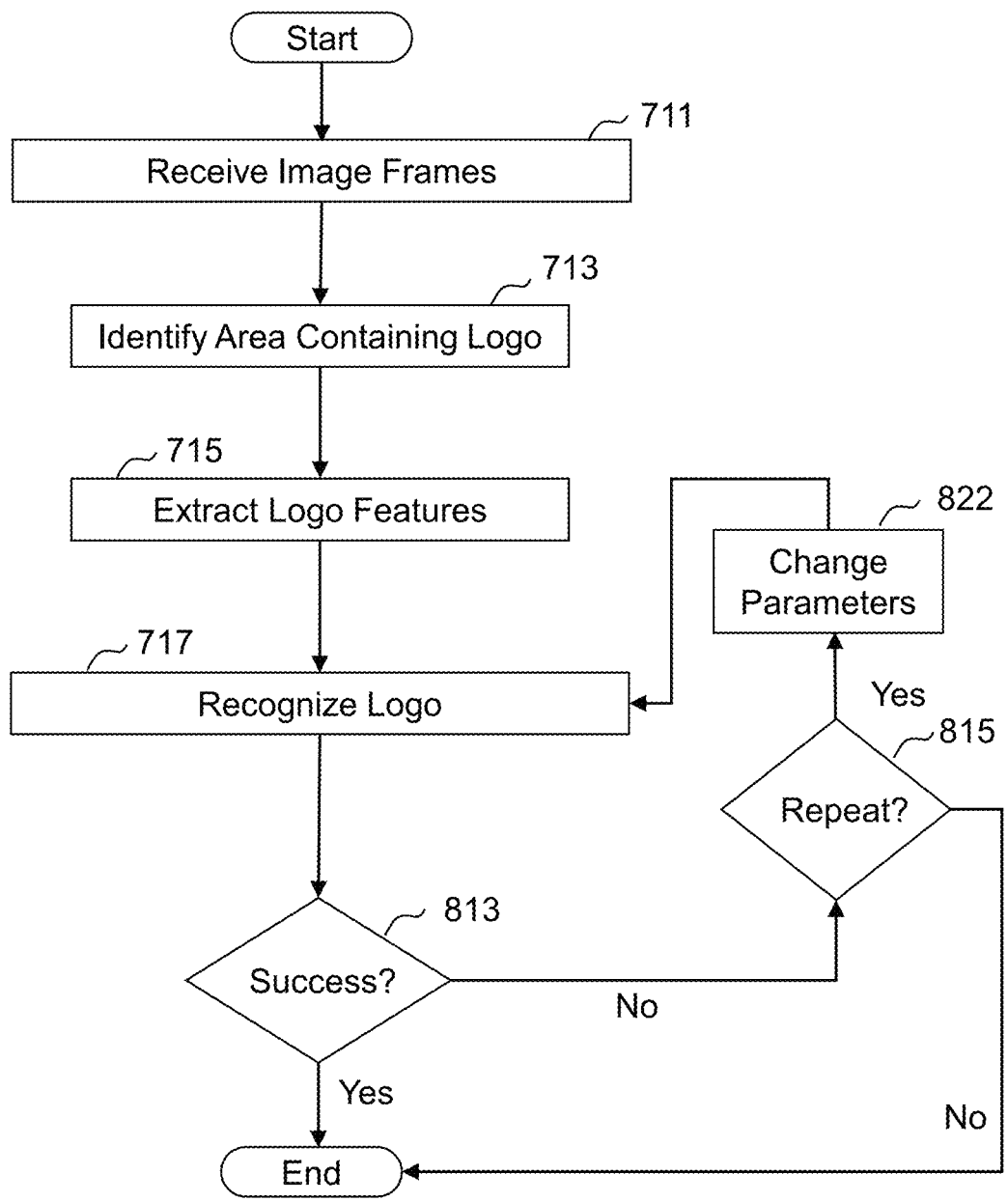

FIG. 8D shows a process 803 that is a variation of process 800. The same numbered steps of process 803 are the same as the corresponding steps of process 800. Additionally, instead of step 817 of process 800, process 803 may include a step 822 that is used to adjust parameters of step 717 for recognizing a logo. For example, parameters of step 717 may determine a type of machine-learning model (e.g., CNN) that may be used for logo recognition. Additionally, or alternatively, parameters of step 717 may include parameters for a machine-learning model (e.g., parameters for a neural network may include weights for connections, number of layers, and the like).

While FIGS. 8A-8D show example processes 800-803, other variations for process 800 may be easily determined by combining and removing some of the steps of processes 800-803. For example, step 817 of process 802 and step 820 of process 802 may be combined to improve logo identification within a video stream. Alternatively, step 817 of process 800 may be combined with step 822 of process 803, or step 820 of process 802 and step 822 of process 803 may be combined. In some cases, steps 817, 820, and 822 may be combined.

The disclosed systems and methods may be applicable to various video streams and may be processed by computing system 120 having suitable hardware and software components. For example, the disclosed systems and methods can be used for video streams having multiple encoding, encryption, and packaging technologies. The disclosed methods may be employed with multiple packaging technologies such as common media application format (CMAF), MPEG-DASH, HTTP live streaming (HLS), among others. Further, the disclosed systems and methods may be independent of the streaming mode used by a third party that may distribute the video stream. The disclosed systems and methods can operate with any version of HTTP(s).

Computing System 120, as described above in connection with FIG. 1A may also include processors 124, storage units 126, and databases 129. In some embodiments, computing system 120 may include multiple core processors to handle concurrently multiple operations and/or streams. For example, computing system 120 may include parallel processing units to concurrently handle requests for processing multiple video streams.

In some embodiments, processors 124 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, processors 124 may be a plurality of devices coupled and configured to perform functions consistent with the disclosure. For example, processors 124 may include a plurality of co-processors, each configured to run specific edge computing system 131 operations such as floating-point arithmetic, graphics, signal processing, string processing, cryptography or I/O interfacing. In some embodiments, processors may include a field-programmable gate array (FPGA), central processing units (CPUs), graphical processing units (GPUs), and the like. For example, GPUs may be used by image recognition application 123.

As discussed, computing system 120 may include database 129 for storing various images of logos. Database 129 may include one or more computing devices configured with appropriate software to perform operations for providing content to system 120. Database 129 may include, for example, Oracle™ database, Sybase™ database, or other relational databases or non-relational databases, such as Hadoop™ sequence files, HBase™, or Cassandra™. In an illustrative embodiment, database 129 may include computing components (e.g., database management system, database server, etc.) configured to receive and process requests for data stored in memory devices of the database and to provide data from the database. Database 129 may be configured to collect images of various logos from a variety of sources, including, for instance, online resources. In some cases, images of the same logo having various resolutions may be collected.

In an example embodiment, as previously described, computing system 120 may include a web crawler configured to crawl a network of websites (e.g., a web crawler may be configured to crawl a YouTube website) and obtain portions of video streams provided by these websites that may be analyzed by computing system 120. In an example embodiment, a web crawler may select some of the image frames of a video stream. For instance, the web crawler may select a section of the video stream, or the web crawler may select several sections of the video stream. The web crawler may be configured to crawl any suitable network such as the Internet, a Local Area Network, a network based on near field communication (NFC), and the like.

In some instances, a broadcast provider may be configured to obtain information from a multimedia content provider. The multimedia content provider may inform the broadcast provider regarding which multimedia content is popular, and the broadcast provider may analyze the popular content and identify logos in such content.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for identifying a logo within at least one image, the method comprising:
   identifying an area containing the logo within the at least one image, wherein identifying the area comprises at least one of a first approach using a character recognition algorithm or a second approach identifying the area by identifying a target area at a target location of the at least one image;
   extracting logo features from the area by analyzing image gradient vectors associated with the at least one image;
   generating a representation of the logo using the extracted logo features;
   identifying a manipulative action for improving the representation of the logo;
   performing the identified manipulative action for improving the representation of the logo;
   using a machine learning model to identify the logo from the representation of the logo, wherein the machine learning model is trained to identify at least one target logo based on a received image data containing the at least one target logo and the machine learning model provides a score corresponding to the probability that the logo is correctly identified;
   using the first approach to determine whether the score is above a threshold value and using the second approach when the score is below the threshold value;
   determining that the at least one image comprises at least one image frame of a video stream; and
   determining that the logo represents a video content provider.

2. The method of claim 1, wherein a histogram of oriented gradient method is used for extracting the logo features.

3. The method of claim 1, wherein the machine learning model is a support vector machine.

4. The method of claim 1, wherein the machine learning model is a convolutional neural network.

5. The method of claim 1, wherein identifying the area further comprises:
   the first approach comprising identifying logo characters within the at least one image, and identifying the area such that identified logo characters are contained within the area;
   the second approach comprising detecting a location of logo characters within the at least one image, and identifying the area by identifying a target area of the image centered at the detected location;
   a third approach comprising using a character recognition algorithm, detecting a corner of the at least one image closest to a location of logo characters, and identifying the area by identifying a target area at the corner; and
   a fourth approach comprising identifying the area by identifying a target area at a target location of the at least one image, wherein the target location is based on an expected location of the logo.

6. The method of claim 5, wherein the expected location of the logo is based on information about the video content provider.

7. The method of claim 5, wherein the machine learning model provides a score corresponding to a probability that the logo is correctly identified.

8. The method of claim 7, further comprising:
   determining whether the score is above a threshold value; and
   using the fourth approach when the score is below the threshold value.

9. The method of claim 7, further comprising:
   using the first approach;
   determining whether the score is above a threshold value; and
   using the second approach when the score is below the threshold value.

10. The method of claim 7, further comprising:
    using the first approach;
    determining whether the score is above a threshold value; and
    using the third approach when the score is below the threshold value.

11. The method of claim 7, further comprising:
    using the first approach;
    determining whether the score is above a first threshold value;
    using one of the second or the third approach if the score is below the first threshold value;
    determining whether the score is above a second threshold value; and
    using the fourth approach when the score is below the second threshold value.

12. The method of claim 1, further comprising:
    calculating a statistical vector of the representation of the logo; and
    comparing the calculated statistical vector to a corresponding statistical vector of the target logo.

13. The method of claim 1, further comprising modifying parameters for performing extraction of the logo features based on whether the target logo is identified.

14. A method for identifying a logo with a video signal, the method comprising:
    determining pixels within image frames of the video signal such that a pixel from the pixels has a color value that changes periodically in the image frames by performing operations comprising:
    calculating a period corresponding to color fluctuations of the pixel across at least some of the image frames;
    comparing the period to a target period indicating that the pixel belongs to a target logo;
    extracting the pixels from an image frame of the image frames matching the target period; and
    using a machine learning model to identify the logo from an image formed at least in part by the extracted pixels, wherein the machine learning model is trained to identify at least one target logo based on a received image data containing the target logo.

15. The method of claim 14, wherein the machine learning model provides a score corresponding to a probability that the logo is correctly identified.

16. The method of claim 15, further comprising:
    determining whether the score is above a threshold value; and
    when the score is below the threshold value:
    identifying an area containing the logo within at least one image in the image frames;

extracting logo features from the area by analyzing image gradient vectors; and using a machine learning model to identify the logo from the extracted logo features, wherein the machine learning model is trained to identify at least one target logo based on a received image data containing the logo features.

17. The method of claim 16, wherein a histogram of oriented gradient method is used for extracting the logo features.

18. The method of claim 16, wherein identifying the area comprises at least one of:
- a first approach comprising using a character recognition algorithm, identifying logo characters within the at least one image, and identifying the area such that identified logo characters are contained within the area;
- a second approach comprising using a character recognition algorithm, detecting a location of logo characters within the at least one image, and identifying the area by identifying a target area of the image centered at the detected location;
- a third approach comprising using a character recognition algorithm, detecting a corner of the at least one image that includes a location of logo characters, and identifying the area by identifying a target area at the corner; and
- a fourth approach comprising identifying the area by identifying a target area at a target location of the at least one image, wherein the target location is based on an expected location of the logo.

19. A system for identifying a logo within at least one image, the system comprising a processor configured to execute instructions to perform operations comprising:
- identifying an area containing the logo within the at least one image, wherein identifying the area comprises at least one of a first approach using a character recognition algorithm or a second approach identifying the area by identifying a target area at a target location of the at least one image;
- extracting logo features from the area by analyzing image gradient vectors associated with the at least one image;
- generating a representation of the logo using the extracted logo features;
- identifying a manipulative action for improving the representation of the logo;
- performing the identified manipulative action for improving the representation of the logo;
- using a machine learning model to identify the logo from the representation of the logo, wherein the machine learning model is trained to identify at least one target logo based on a received image data containing the at least one target logo and the machine learning model provides a score corresponding to the probability that the logo is correctly identified;
- using the first approach to determine whether the score is above a threshold value and using the second approach when the score is below the threshold value;
- determining that the at least one image comprises at least one image frame of a video stream; and
- determining that the logo represents a video content provider.

20. A method for identifying a logo within at least one image, the method comprising:
- identifying an area containing the logo within the at least one image, wherein identifying the area comprises using a character recognition algorithm, detecting a location of logo characters within the at least one image, and identifying the area by identifying a target area of the image centered at the detected location;
- extracting logo features from the area by analyzing image gradient vectors associated with the at least one image;
- using a machine learning model to identify the logo from the extracted logo features, wherein the machine learning model is trained to identify at least one target logo based on a received image data containing the logo features and the machine learning model provides a score corresponding to the probability that the logo is correctly identified;
- using the first approach to determine whether the score is above a threshold value and using the second approach when the score is below the threshold value;
- determining that the at least one image comprises at least one image frame of a video stream; and
- determining that the logo represents a video content provider.

21. A method for identifying a logo within at least one image, the method comprising:
- identifying an area containing the logo within the at least one image, wherein identifying the area comprises using a character recognition algorithm, detecting a corner of the at least one image closest to a location of logo characters, and identifying the area by identifying a target area at the corner;
- extracting logo features from the area by analyzing image gradient vectors associated with the at least one image;
- using a machine learning model to identify the logo from the extracted logo features, wherein the machine learning model is trained to identify at least one target logo based on a received image data containing the logo features and the machine learning model provides a score corresponding to the probability that the logo is correctly identified;
- using the first approach to determine whether the score is above a threshold value and using the second approach when the score is below the threshold value;
- determining that the at least one image comprises at least one image frame of a video stream; and
- determining that the logo represents a video content provider.

* * * * *